Nov. 28, 1933.  E. E. GEORGE  1,937,339
REFLECTING DEVICE
Filed Dec. 22, 1932
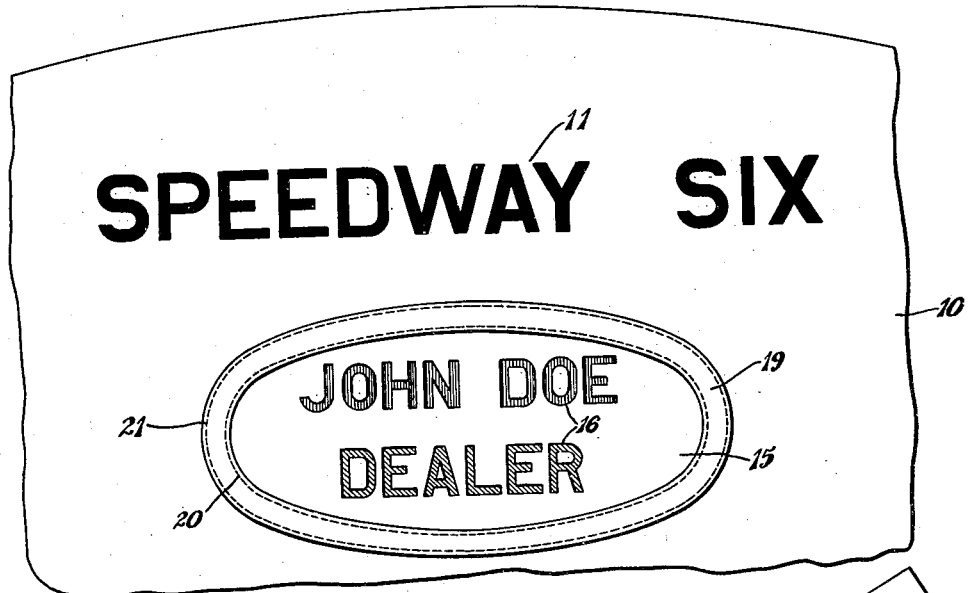
Fig. 1
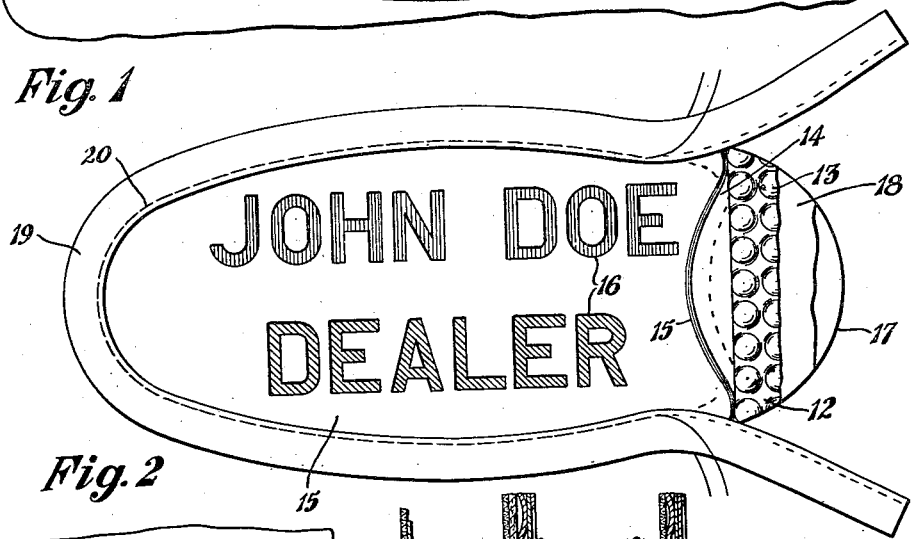
Fig. 2
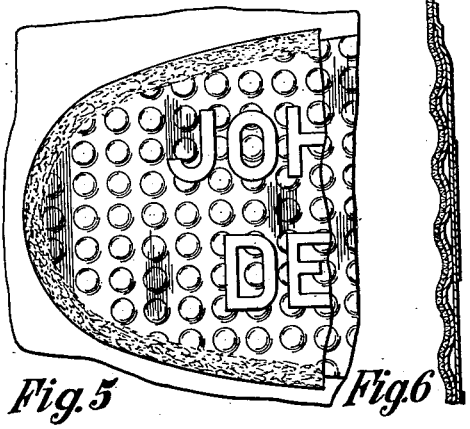
Fig. 5
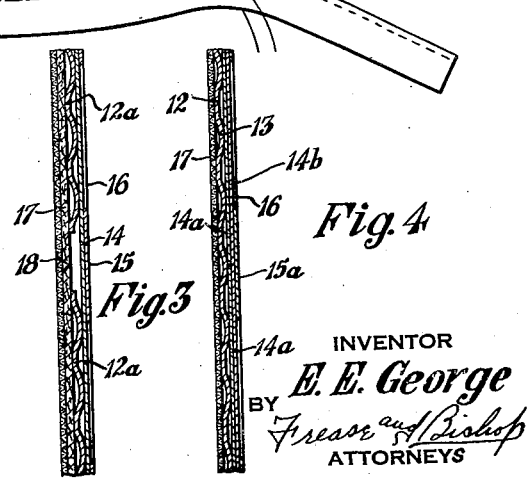
INVENTOR
E. E. George
BY
ATTORNEYS Patented Nov. 28, 1933

1,937,339

UNITED STATES PATENT OFFICE 1,937,339

REFLECTING DEVICE

Edgar E. George, Canton, Ohio, assignor to The Buttonless Tire Cover Company, Canton, Ohio, a corporation of Ohio Application December 22, 1932. Serial No. 648,417

5 Claims. (Cl. 40—135)

The invention relates to devices for coloring and reflecting light rays, and more particularly to a device of this character in which the medium through which the light rays are colored and reflected consists of a pliable or flexible transparent sheet material such as celluloid, pyralin or the like; and the reflecting medium consists of a soft, thin metal sheet such as aluminum, zinc, plated copper or the like.

The improved reflecting device may be used for many purposes such as display signs, door numbers, warning signals, and advertising devices; and is especially adapted for use as an advertising or display device arranged to be attached to a spare tire cover as by stitching, or other suitable fastening means, or to be otherwise mounted upon automobiles, trucks, busses or other motor vehicles.

It is general practice for the automobile manufacturers to place their trade-mark upon spare tire covers which they sell to the automobile dealers for use upon cars of their manufacture, and many of the automobile manufacturers will not permit the dealers to obtain spare tire covers, bearing their trade-mark, from other sources.

The automobile dealers naturally desire to have their own advertisement or identification upon the tire covers which they distribute, but since the tire covers which they obtain from the automobile manufacturer, of course, bear only the manufacturer's trade-mark, and the dealer is prohibited by the company from obtaining covers from other sources having the automobile manufacturer's trade-mark thereon, it is becoming general practice for the dealer to either use the tire covers obtained from the automobile manufacturer bearing only the manufacturer's trade-mark, or to obtain tire covers from some other source bearing only the dealer's identification or advertisement.

Naturally, the dealer in any particular automobile is desirous of advertising the automobile which he sells as well as himself, and would prefer to have both the trade-mark or advertisement of the manufacturer as well as his own advertisement or identification upon the tire covers which he distributes.

It is therefore an object of the present invention to provide an advertising or display device which may bear any identification for advertisement of the automobile dealer and which may be quickly and readily attached to the tire cover obtained from the automobile manufacturer bearing the manufacturer's trade-mark.

Another object of the improvement is to provide a reflecting device of this nature formed of such material that it may be quickly and easily attached to the tire cover as by stitching the reflecting device upon the tire cover.

A further object of the improvement is to provide a reflecting device provided with a sheet of flexible or pliable transparent material upon which any desired configuration or design may be produced by the use of an opaque paint or the like covering certain portions of the sheet so that light may be reflected through the uncovered portions of the sheet which may be colored in any desired combination.

A still further object is to provide a reflecting device comprising a thin sheet of soft metal having a reflecting surface which may have formed thereon a multiplicity of convex portions, a pliable or flexible transparent sheet material, which may be colored as desired and provided with any design by covering a portion of the surface thereof with an opaque paint or the like, being placed over the reflecting surface of the sheet, a flexible covering of fabric or the like being preferably placed behind the reflecting surface, which may be reinforced by a sheet of cardboard or the like, a binding which may be fabric material, such as gimp, being located around the edge of the device and stitched thereto in order to bind the several parts together.

Still another object of the improvement is to provide a reflecting device in which two or more transparent sheets of different colors may be provided for variously coloring different portions of the device, a clear transparent sheet being located over the several colored transparent sheets and having any desired design or lettering produced thereon by means of opaque paint or the like.

A further object is to provide a reflecting device of the general character referred to in which the reflecting medium may be formed of separate portions attached to a reinforcing back member of cardboard or the like and each portion being located behind one of the transparent portions of the colored sheet.

A still further object of the improvement is to provide a reflecting device of the general character referred to in which the sheet metal reflector is substantially sealed between a preferably water-proof fabric back and a flexible or pliable transparent, colored sheet of material such as celluloid or pyralin.

Another object is to provide such a reflector in which the fabric back is embossed upon the back surface of the sheet metal reflector and cemented thereto.

Still another object is to cement the fabric to the back of the sheet metal reflector preferably by a thermo-plastic cement, by the application of pressure and heat.

A further object is to provide means for attaching the celluloid or pyralin sheet to the metal reflector by fusing the edge portions of the transparent sheet so as to cause the same to adhere tightly to the metal, this fusing being preferably produced by applying a soluble solvent which may include ethyl acetate, or butyl acetate, or a combination thereof.

The above, together with other objects which will be apparent from the following description, and the accompanying drawing, or which will be later pointed out, may be attained by constructing the invention in the manner illustrated in the accompanying drawing, in which Figure 1 is a fragmentary elevation of the upper portion of a tire cover having the automobile manufacturer's trade-mark imprinted thereon, and showing one of the improved reflecting devices, bearing the dealer's identification, attached to the tire cover as by stitching;

Fig. 2, a front elevation of a reflecting device formed in accordance with the invention, a portion of the gimp or binding being ripped away and the adjacent portion of the transparent sheet being turned back to disclose the reflecting surface of the sheet metal reflector, the cardboard reinforcing sheet and the fabric back;

Fig. 3, a transverse sectional view, on an enlarged scale, through a portion of a reflecting device, provided with a cardboard reinforcing sheet, and having the reflecting medium formed of spaced sheets or strips positioned behind the transparent portions of the coloring medium;

Fig. 4, a similar view of another form of the invention, showing the transparent medium made up of a plurality of different colored sheets or strips covered by a transparent, clear sheet;

Fig. 5, a fragmentary front elevation of a portion of a tire cover or the like showing the transparent sheet fused at its edges to the metal reflector; and Fig. 6, a transverse sectional view of a reflecting device showing the fabric embossed and cemented to the back surface of the sheet metal reflector and the edge portions of the transparent sheet fused upon the metal reflector.

Similar numerals refer to similar parts throughout the drawing.

The upper portion of a spare tire cover, which may be formed of the customary oilcloth or similar fabric material, is indicated generally by the numeral 10 and may have imprinted thereon, as in usual practice, the trade-mark of the automobile manufacturer, as indicated at 11.

A reflecting device embodying the invention may be stitched or otherwise attached to the tire cover, preferably below the manufacturer's trade-mark, for the purpose of placing the dealer's identification or advertisement upon the tire cover.

The improved reflecting device is provided with a reflecting medium in the form of a thin sheet of soft metal such as aluminum, zinc, or soft copper plated metal or the like, indicated generally at 12, and preferably provided upon its front or reflecting surface with a multiplicity of convex slight projections or raised portions, as indicated generally at 13.

A transparent sheet of flexible or pliable material such as celluloid, pyralin or the like, preferably colored, is located over the front of the reflecting medium as indicated generally at 14, any suitable design or lettering being produced thereon by covering portions of the transparent sheet with an opaque paint or the like, as indicated at 15, leaving the remaining portions of the transparent sheet exposed, as indicated at 16, so that light rays passing therethrough may be colored and reflected back by the reflecting medium 12.

If desired, the transparent sheet may be clear, and a transparent coloring may be placed upon the back surface thereof at the exposed portions of the sheet, whereby different colors may be provided for different portions of the sheet.

A covering of fabric, leather or the like, as indicated at 17, is preferably located back of the reflector 12, and if desired, a layer of cardboard or the like as at 18 may be interposed therebetween for the purpose of reinforcing the structure.

A flexible binding, such as gimp or the like, as indicated at 19, may be located around the edge of the reflector, being connected to the various layers or laminations thereof as by the stitching shown at 20, the various sheets of material which go to make up the device, even the metal reflecting medium, being sufficiently thin and of soft enough material to permit sewing or stitching therethrough.

Although the device is shown as of oval shape, it should be understood that the particular contour of the outline of the device is immaterial and it can be made in any suitable or desired shape. The reflecting device thus formed may be attached to the tire cover by stitching or sewing the same thereon, as indicated at 21 in Fig. 1, thus making it possible for the dealer's identification or advertisement to be easily and readily placed upon the tire covers which he obtains from the automobile manufacturer. If desired, the dealer may attach the reflector device to the tire cover with any suitable sort of fastening device or clasp instead of stitching the same thereon.

Instead of using a colored transparent sheet over the entire surface of the device, strips or narrow sheets of different colors may be located over various parts of the reflector, as indicated at 14a in Fig. 4, the same being covered by a single sheet of transparent clear material 14b upon which the design or lettering may be painted or blocked out by opaque paint or the like, as indicated at 15a.

Instead of having a single sheet metal reflecting medium covering the entire back of the transparent colored sheet 14, narrow sheets or strips thereof, as shown at 12a in Fig. 3, may be placed back of the various exposed portions of the transparent sheet, being connected as to the cardboard backing sheet 18 in any suitable manner.

The invention may be carried out by attaching the sheet metal to the fabric of the tire cover or the like by cement or glue instead of stitching, as above described. In this case any kind of cement or glue may be used, but it is preferable to use a thermo-plastic cement in which case both heat and pressure are applied to cause the metal to adhere to the fabric, which may be of any description, either coated or uncoated, but preferably water-proof.

For the purpose of causing the fabric to adhere more tightly to the sheet metal, the two materials are preferably embossed as shown in Fig. 6, the embossing being preferably produced by pressing the two sheet materials together between suitable embossing dies, with the glue or cement placed between the sheets; and if thermo-plastic cement is used, heat may be applied with the pressure for producing the embossing.

It will be seen that in this manner the invention may, if desired, be carried out with the use of a transparent colored sheet over the sheet metal, any design or configuration being worked out upon the fabric by the attaching of the sheet metal thereto.

However, where it is desired to carry out the coloring effect, a sheet 15 of celluloid, pyralin, or the like, may be placed over the sheet metal and attached thereto by fusing the edge portions of the celluloid, or the like, as shown at 21 in Fig. 5, so as to cause the same to adhere tightly to the sheet metal, or fabric, or both if desired, thus producing a watertight structure in which the sheet metal reflector is sealed between the waterproof fabric and the transparent sheet which is also water-proof.

This fusing may be caused by applying a soluble solvent to the edge portions of the celluloid or pyralin, which partially dissolves, or softens the same, permitting it to be tightly adhered to the sheet metal or fabric. Upon drying a perfect seal is produced. The solvent best adapted for the purpose preferably contains ethyl acetate, or butyl acetate, or a combination of both.

The opaque coating of paint or the like may be applied to either surface of the celluloid or pyralin, or, if desired, may be applied to the reflecting surface of the sheet metal, the object of the same being merely to cover portions of the device so that the desired design may be worked out in the device, whereby certain portions of the same are unobstructed, permitting light rays to be reflected and colored thereby.

Although the invention has been illustrated and described in detail as especially adapted for use upon automobile spare tire covers, it should be understood that it may be used for many other purposes such as display signs, door numbers, warning signals and advertising devices and may be used upon motor vehicles not only for spare tire covers but for conveying various information upon the rear of busses such as "This bus stops at all railroad crossings", and for advertising purposes upon trucks and the like, in which case a metallic frame may surround the device instead of the gimp or fabric binding.

I claim:

1. A reflecting device including a thin, soft sheet metal reflector, a transparent, colored, flexible sheet of material positioned in front of said reflector, portions of the surface of said transparent sheet having an opaque coating in the form of a predetermined design thereon, and a binding surrounding the edges of said sheets and stitched thereto.

2. A reflecting device including a thin sheet aluminum reflector, a transparent, colored, flexible sheet of material positioned in front of said reflector, portions of the surface of said transparent sheet having an opaque coating in the form of a predetermined design thereon, and a binding surrounding the edges of said sheets and stitched thereto.

3. A reflecting device including a thin sheet zinc reflector, a transparent, colored, flexible sheet of material positioned in front of said reflector, portions of the surface of said transparent sheet having an opaque coating in the form of a predetermined design thereon, and a binding surrounding the edges of said sheets and stitched thereto.

4. A reflecting device including a thin, soft copper plated sheet metal reflector, a transparent, colored, flexible sheet of material positioned in front of said reflector, portions of the surface of said transparent sheet having an opaque coating in the form of a predetermined design thereon, and a binding surrounding the edges of said sheets and stitched thereto.

5. A reflecting device including a thin, soft sheet metal reflector provided upon its reflecting surface with a multiplicity of convex projections, a transparent, flexible sheet of material positioned in front of said reflector, portions of said transparent sheet having an opaque covering in the form of a predetermined design thereon, and a binding surrounding the edges of said sheets and stitched thereto.

EDGAR E. GEORGE.